(12) United States Patent (10) Patent No.: US 10,011,451 B2
Bussmann et al. (45) Date of Patent: Jul. 3, 2018

(54) REVERSING DEVICE FOR A FILM WEB BY MEANS OF AN EXPANDER ROLLER

(71) Applicant: Windmoeller & Hoelscher KG, Lengerich (DE)

(72) Inventors: Markus Bussmann, Essen (DE); Tim Kirchhoff, Muenster (DE); Frank Hoffmann, Greven (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 0 days.

(21) Appl. No.: 14/413,500

(22) PCT Filed: Jun. 27, 2013

(86) PCT No.: PCT/EP2013/063570
§ 371 (c)(1),
(2) Date: Jan. 8, 2015

(87) PCT Pub. No.: WO2014/012765
PCT Pub. Date: Jan. 23, 2014

(65) Prior Publication Data
US 2015/0158690 A1 Jun. 11, 2015

(30) Foreign Application Priority Data
Jul. 16, 2012 (DE) .................. 10 2012 106 389

(51) Int. Cl.
*B29C 47/90* (2006.01)
*B65H 23/025* (2006.01)
(Continued)

(52) U.S. Cl.
CPC ..... *B65H 23/0251* (2013.01); *B29C 47/0057* (2013.01); *B65H 23/32* (2013.01);
(Continued)

(58) Field of Classification Search
CPC ........ B29C 47/0057; B65H 2301/4432; B65H 2404/131; B65H 2404/561;
(Continued)

(56) References Cited

U.S. PATENT DOCUMENTS 3,768,949 A * 10/1973 Upmeier ............. B29C 47/0009
264/564
4,566,162 A 1/1986 Brands
(Continued)

FOREIGN PATENT DOCUMENTS

CA 2 179 438 12/1996
DE 245 093 7/1910
(Continued)

*Primary Examiner* — Yogendra N Gupta
*Assistant Examiner* — Joseph S Leyson
(74) *Attorney, Agent, or Firm* — Jacobson Holman, PLLC.

(57) ABSTRACT

A reversing device for a film web, which has a take-off device, has at least one turning device and at least one deflecting roller. The film web can be guided by the take-off device via the at least one turning device and the at least one deflecting roller to a winding device. The axes of the take-off device, the at least one turning device, and the at least one deflecting roller are adjustable in angle relative to one another. The at least one deflecting roller is formed as an expander roller having an expanding capacity which increases towards the end faces of the deflecting roller.

10 Claims, 5 Drawing Sheets

(51) Int. Cl.
*B29C 47/00* (2006.01)
*B65H 23/32* (2006.01)

(52) U.S. Cl.
CPC ............... *B65H 2301/4432* (2013.01); *B65H 2404/131* (2013.01); *B65H 2404/561* (2013.01); *B65H 2701/175* (2013.01); *B65H 2701/1752* (2013.01)

(58) Field of Classification Search
CPC ...... B65H 2701/175; B65H 2701/1752; B65H 23/0251; B65H 23/32
See application file for complete search history.

(56) References Cited

U.S. PATENT DOCUMENTS

| | | | | |
|---|---|---|---|---|
| 4,634,358 A | * | 1/1987 | Dellbrugge | B29C 53/10 264/209.2 |
| 5,589,201 A | * | 12/1996 | Tkach | B29C 47/0021 425/327 |
| 5,674,540 A | * | 10/1997 | Sensen | B29C 47/0026 264/209.3 |
| 6,241,502 B1 | * | 6/2001 | Baeumer | B29C 47/0009 425/326.1 |
| 7,347,680 B2 | | 3/2008 | Hessenbruch | |
| 2005/0112227 A1 | * | 5/2005 | Hessenbruch | B29C 47/0009 425/326.1 |

FOREIGN PATENT DOCUMENTS

| | | |
|---|---|---|
| DE | 10 2006 012 355 | 9/2007 |
| DE | 102010055168 | 6/2012 |
| EP | 0711648 | 5/1993 |
| EP | 0749823 | 12/1996 |
| EP | 1533100 | 5/2005 |

* cited by examiner

REVERSING DEVICE FOR A FILM WEB BY MEANS OF AN EXPANDER ROLLER

CROSS-REFERENCE TO RELATED APPLICATIONS

This is a national stage of PCT/EP2013/063570, filed Jun. 27, 2013.

BACKGROUND OF THE INVENTION

1. Field of Invention

The invention relates to a reversing device for a film web, a flat laying device for laying flat of a film bubble towards a film web and a film blowing machine with such a reversing device.

2. Description of the Prior Art

Reversing devices for film webs are basically known. Known reversing devices are assembled between a winding device and a flat laying device of a film blowing machine. For reversing the film web a plurality of different rollers are used, particularly a take-off device with at least two take-off rollers, at least one deflection roller and at least one turning device. The axes of the turning device, the deflection roller and the take-off device are angularly alterable to one another. With other words with the use of such a reversing device a flat laid film web can be tilted about an axis in both directions alongside the center of this film web. Since with known film blowing machines a winding device for winding of the completed film web must be intended and this winding device often comprises a static axis, depending on the angular engaging situation of the deflection roller, the turning device and the take-off device an angle difference exists towards the orientation of the axis of the winding device.

This leads to the fact that with a known reversing device a slow and steady lead back to an axis parallelism towards the axis of the winding device has to be performed. With known reversing devices herewith usually a diverse angular adjustment with diverse angular degrees of the single deflection rollers, the individual turning devices and the take-off device is performed. Thereby, during the development, starting from the take-off device via the deflection roller and the turning device, the film web is adjusted vertically and thereby parallel towards the winding device.

It is a disadvantage of known reversing devices that due to the reversing the danger of drapery occurs. The reversing basically serves for shifting possible defects within the film web in a way that they are not potentiating one another on the winding device and thereby no so called lobe rings are recognizable as thickening on the winding device. Despite the avoidance of this disadvantage the danger exists within the reversing device that cuttling occurs in the film web and stays within. If such cuttling is wrapped onto the winding device, this leads to partly high mechanic strengths or to cuttling fold, which occurs with an unaesthetic appearance. Accordingly such a wrapped film web is of minor quality and even waste.

SUMMARY OF THE INVENTION

It is the object of the present invention to at least partially resolve the previously described disadvantages. Particularly it is the object of the present invention to provide a reversing device for a film web, a flat laying device and a film blowing machine with such a reversing device, which is cost efficient and provides an improved winding behavior in a simple manner, particularly with avoiding or reducing the waste of the winding device.

The previous object is solved by a reversing device for a film blowing machine, a flat laying device, and by a film blowing machine, with each having the features described herein. Further features and details of the invention are described herein and depicted in the drawings. Thereby the features and details which are described in correlation with the reverse device according to the invention naturally also apply in accordance with the film blowing machine and vice versa, so that concerning the disclosure of the single aspects of the invention it can always be alternately referred to.

A reversing device according to the invention for a film web comprises a take-off device, at least one turning device and at least one deflection roller. Thereby the film web is guidable from the take-off device via the at least one turning device and the at least one deflection roller towards the winding device. The axes of the take-off device of the at least one turning device and the at least one deflection roller are angularly displaceable to one another. A reversing device according to the invention is characterized in that the at least one deflection roller is provided as an expander roller with increasing expander ability towards the end faces of the deflection roller.

A reversing device according to the invention for a film web based on the known film web leads to a shifting of the defects by reversing within the film web. The reversing by the angular engagement of the single axes of the take-off device, the turning device and the deflection roller to one another leads to not adding the defects on a winding device and correspondingly so called lobe rings are avoided as added defects on the winding device. In order to additionally avoid the appearance of cuttling and the resisting of cuttling within the reversing device according to the invention at least one of the at least one deflection roller is performed as an expander roller. Such an expander roller comprises particularly expander elements, which are able to delete cuttling from the film web during the distribution. Such expander elements can for example be lamella-like structures or bristles.

Due to the fact that with a reversing device according to the invention a continuous or semi-continuous change of the angular engagement of the axes of the take-off device, the at least one turning device and the at least one deflection roller occur to one another, continuously a different inlet situation on the turning device and the at least one deflection roller occurs. With the expander roller the degree of the expander ability depends upon the corresponding inlet length. Since via the at least one deflection roller and the at least one turning device the film web is again in its vertical position and therewith lead back axis parallel towards the axis of the winding device, angles occurs between the axis of the turning device and the deflection roller, which is not rectangular or not 180°. During the reversing movement these axes are particularly not or not only for one time assembled vertically to one another during the passage of the center position. This leads to the fact that the axes angularly adjusted to one another comprise diverse sizes of entrance lengths on both side notches of the film web. Due to the fact that the expander ability of an expander roller depends on the entrance length, according to this also the expander ability varies depending on the angular engagement position of the axes of the turning device and the deflection roller to one another. The entrance length preferably means the loose distance between two rolls meaning the unguided distance of the film web between two rolls, cylinders or rollers.

Due to the fact that different entrance lengths lead to different expander abilities, basically with known reversing devices an efficient cuttling removal cannot occur in the whole reverse angle area of the reversing device. Thus it can occur that the reversing device does not provide sufficient expending ability in its extreme positions in order to smooth the cuttling towards the outside. According to the invention the expander roller is thus provided with increasing expander ability towards the end faces of the deflection roller.

Thereby expander ability means the degree with which the cuttling can be removed from the film web. The expander ability can also be named as transportability or cuttling transportability. Preferably expander ability means that the film web is straightened over the width of the deflection roller. By tractive force to the film web towards the end faces of the deflection roller the cuttling are straightened or removed. The expander ability is for example defined by geometric parameters of single expander elements. Therewith, for example lamella, bristle or bristle-like structures can comprise an angular engagement which concerning the attack angle increases from the center of the deflection roller towards the end faces. The expander ability can also be understood as an increase of the expander force from the inside towards the outside to the end faces of the deflection roller.

A reversing device according to the invention relates particularly to a film web which is produced from a film blowing machine. It is assembled after the flat laying of the produced film bubble in order to reverse the film bubble which was laid flat as a film web. Subsequently to the reversing device according to the invention the transport to the winding device occurs, which is a separate component of the film blowing machine and no longer from the reversing device.

The take-off device is in a manner according to the invention particularly a combination from at least two take-off rollers. These are assembled to one another in a way that the film web runs between these two take-off rollers. Preferably the distance between both take-off rollers is adjustable or variable so that at the same time a squeezing can occur in order to avoid air bubbles within the film web after the flat laying period. At the same time the deflection rollers can be actively actuated so that an active conveyance or an active transport of the film web is possible through the take-off device. Also the deflection rollers can be actuated or solely pivotably mounted.

Through an expander roller with expander elements particularly assembled at the peripheral surface with an increasing expander ability towards the end faces of the deflection roller, therewith a combination of two fault corrections is provided. On the one hand a displacement of possible defects of the film web is reached by reversing, so that so called lobe rings can be actively avoided as added surface defects on the winding device. By a corresponding embodiment according to the invention of the at least one deflection roller further an already existing drapery or a during the reversing due to the engagement of the deflection roller to the turning device and to the take-off device resulting drapery is avoided or compensated and smoothed.

A reversing device according to the invention can be further developed in a way that a deflection roller comprises at least sectionally expander elements on the peripheral surface, which comprises an attack angle which increases in the direction of the end faces of the deflection roller. Expander elements are particularly elements which extend radially or mainly radially away from the peripheral surface. The attack angles are thereby particularly referred to the radial direction towards the axis of the deflection roller. An expander element which is for example shaped bristle-like and extends radially thereby comprises an attack angle of 0°. An engagement away from this radial direction leads to an increasing attack angle. The stronger the attack angle of such an expander element is developed the higher is the force which can be applied on the conveyed film web. By an increasement of the applied force thereby also the corresponding expander ability is increased so that the previously described embodiment Is a possibility to develop an increase according to the invention of the expander ability towards the end faces of the deflection roller.

It can be an advantage when the reversing device of the attack angles according to the invention increases from the center of the deflection roller towards the end faces of the deflection roller from 0° to approximately 45°, particularly to approximately 30°. The center of the deflection roller is thereby not necessarily the geometric center of the deflection roller, but rather regarding the central position or the central web or the central axis of the film web which is conveyed about the deflection roller. This center is at the same time preferably exactly or mainly exactly the axis of rotation, about which the deflection roller is engaged or tilted by an angular engagement relative to the axis of the turning device and the take-off device. The reduction of the attack angles to a magnitude smaller as approximately 45° or smaller as approximately 30° leads to the fact that the maximum force is reached and is no more exceeded. A further engagement in the direction of parallelism of the expander elements towards the axis of the deflection roller, particularly for attack angles in the area between approximately 45° and 90°, would possibly lead to a reduction of the expander force and therewith to an undesired reduction of the expander ability not according to the invention towards the end faces of the deflection roller.

It is further an advantage when by the reversing device according to the invention the expander elements are at least sectionally developed as bristles. This can for example be plastic bristles. Thereby single bristles or bristle bunches can be assembled according to the invention in order to develop the expander ability in an increasing manner in the direction of the end faces of the deflection roller. The development in form of bristles for the expander elements is particularly concerning the raw materials and supplies and concerning the fabrication effort particularly cost efficient.

It is further an advantage when by the reversing device according to the invention the expander ability of the deflection roller increases linear or mainly linear towards the end faces. If the expander ability is reached for example through increasing angles of attack, this angle of attack is particularly linear increased towards the end faces of a deflection roller. Due to the fact that the expander roller increases towards both end faces of the deflection roller, both maximum expander abilities are reached each at both end faces. This occurs preferably in a symmetrical construction manner, so that with a reversing in both directions, with an engagement of the axes of the take-off device one time up to +180° and one time up to −180° a mainly symmetrical effect of the deflection roller shaped as expander roller is achievable. By the linear embodiment of the expander ability, particularly a continuous compensation of the different entrance lengths becomes possible. Further, the production is simplified. The mainly linear process can for example be provided by stepwise or continuous increase of the attack angles.

It is also an advantage when with the reversing device according to the invention the expander ability of the deflection roller increases towards both end faces of the deflection roller symmetrically or mainly symmetrically towards the center of the deflection roller. Here also the center of the deflection roller is regarding to the central position, the central web or the central axis of the film web. The symmetrical or mainly symmetrical increase of the expander ability leads to a symmetrical or mainly symmetrical expander ability in both reversing directions, in direction of +180° and in direction of −180° of the reversing angles. Thereby a mainly even achievement of reversing is achieved like also a cuttling compensation across the whole reversing area.

It is further an advantage when by the reversing device according to the invention the at least one turning device is shaped cylindrical, particularly as an air turning rod. This leads to a particularly cost efficient and simple construction manner since particularly no pivotable mounting of such a turning device is necessary. Is this turning device shaped as an air turning rod, an air cushion between the air turning rod on the one hand and the conveyed film web on the other hand can be provided by the openings in the turning device. This enables a particularly fast and frictionless transport, wherein at the same time the turning device can be statically mounted and must be exclusively developed for the angular alteration of its axis.

According to the invention it is another advantage when by the reversing device based on the take-off device alongside the distribution of the film web a first deflection roller, a first turning device and a second deflection roller, a second turning device and a third deflection roller are assembled. Thereby at least one deflection roller particularly at least the second deflection roller is developed as an expander roller with an increasing expander ability towards the end faces of the deflection roller. The increase of the number of deflection rollers and the turning device to the described number in this embodiment leads to the fact that smaller angle steps between the single rollers or the single turning devices have to exist in order to lead the film web back in its vertical and therewith axis parallel orientation towards the winding device. This reduces the tension in the film web and at the same time provides the advantages according to the invention like described. At the same time this embodiment provides a variation which resigns an unnecessary high number of deflection rollers and turning devices. So this embodiment can particularly be also seen as an ideal number, a compromise between a good lead back ability and a small construction amount.

It is further reasonable according to the invention when by the reversing device the first deflection roller and the take-off device comprise axes assembled parallel or mainly parallel to one another. The entrance from the take-off device occurs without lead back of the film web. So a defined lead back rotation can be provided not before the first deflection roller to the third deflection roller. The film web runs between the take-off device to the first deflection roller and thereby still parallel towards the axes of the take-off device and the first deflection roller. Thereby a common tilting occurs at the same time with the take-off device about the same parameter value also for the deflection roller, likewise about the reversing angle.

The reversing device according to the invention can be further developed in a way that the axis of the third deflection roller can be assembled parallel or mainly parallel towards the axis of the winding device. Therewith the third deflection roller can be developed statically and therewith not tiltable. In this manner the film web can be provided in a defined and non-alterable manner at the end of the reversing device for the further transport to the winding device. The compensation of the reversing angle occurs thereby particularly by a combination of technical solutions of this and the previous paragraph so that the first deflection roller is provided for a start of the lead back, while the third deflection roller already represents an orientation for completely leaded back and thereby vertically assembled film webs.

A reversing device according to the invention is particularly established in a way that the rotation of the first turning device correlates with ¾ of the take-off device and/or the rotation of the second deflection roller correlates with ½ f the rotation of the take-off device and/or the rotation of the second turning device correlates with ¼ of the rotation of the take-off device. During the reversing process particularly a kind of expending of the single axes of the turning device and the deflection roller towards one another occurs. Thereby the angle difference of the axes between the single deflection rollers and the single turning devices is reduced or mainly evenly spread so that the corresponding tension stress of the film web during the reversing or during the lead back is reduced to a minimum.

It is also an advantage according to the invention when by the reversing device at least one cooling roller, particularly corresponding to the distribution of the film web between the take-off device and the at least one deflection roller is assembled. This cooling roller leads to the fact that an additional cooling of the film web is possible. Particularly also an external temperature regulation is possible, so that it is avoided that the increased exposure in the reversing device results in an undesired stretching of the film web.

A further embodiment according to the invention is a flat laying device for flat laying of a film bubble to a film web with a reversing device for reversing the film web wherein the reversing device is established in a manner according to the invention. Correspondingly the same advantages result for the flat laying device like they are described in detail regarding the reversing device according to the invention.

A further embodiment of the present invention is a film blowing machine with at least one film extruder for the establishment of a film bubble, a flat laying device for flag laying of a film bubble to a film web, a reversing device for reversing the film web and the winding device for winding the film web. A film blowing machine according to the invention is characterized in that the reversing device is established in a manner according to the invention. Correspondingly a film blowing machine according to the Invention provides the same advantages like they are described in detail regarding the reversing device according to the invention.

BRIEF DESCRIPTION OF THE DRAWINGS

The present invention is explained in detail regarding the attached drawings. The thereby used terms "left", "right", "up" and "down" relate to the orientation of the figures with normally readable reference numbers, it is shown schematically.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
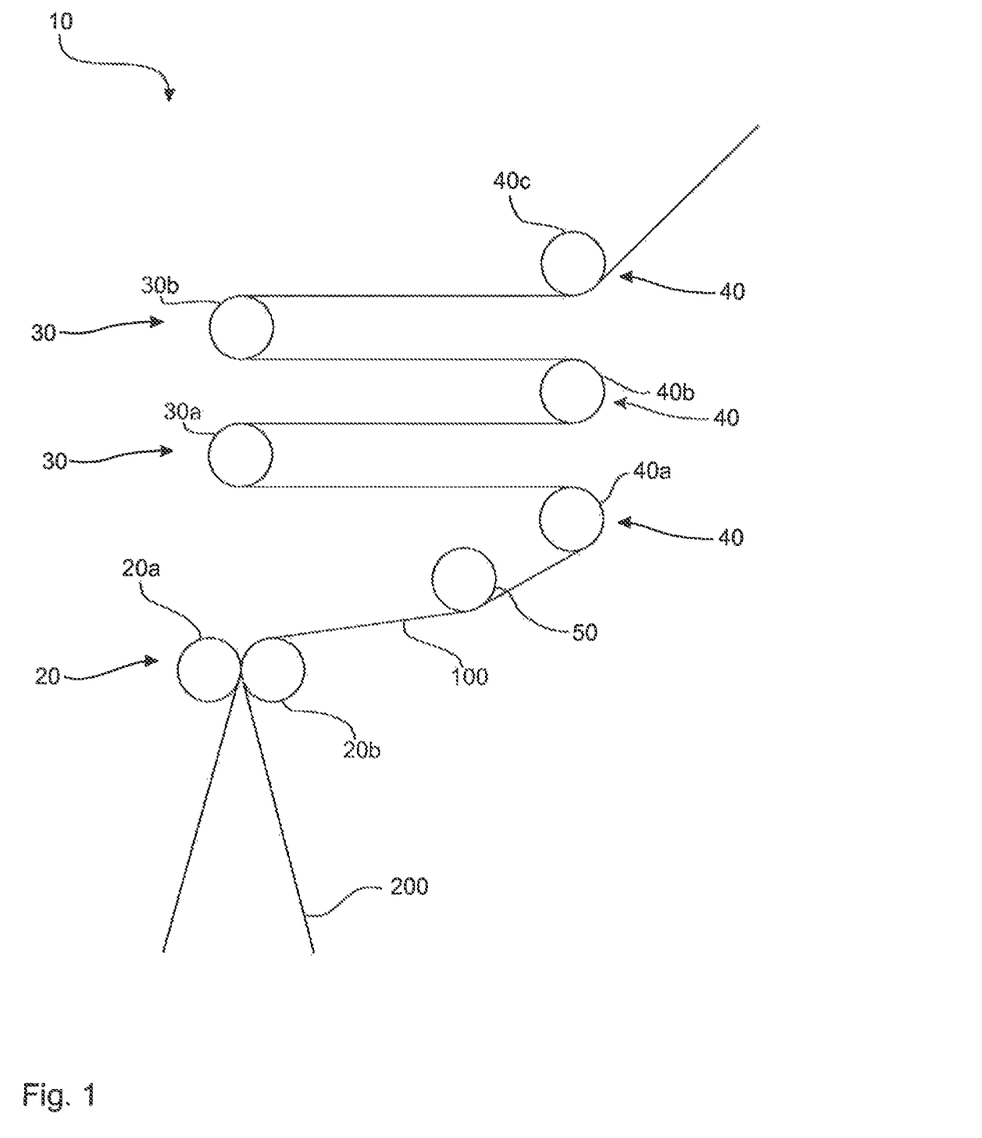
FIG. 1 an embodiment of a reversing device according to the invention.

In FIG. 1 a first embodiment of a reversing device 10 according to the invention is shown. This reversing device comprises a take-off device 20 with two take-off rollers 20a and 20b to which a film bubble 200 is applied in a flat laid manner. At the latest from the take-off device 20 the film bubble 200 is completely laid flat and now the doubled film web 100 is established. This film web 100 is led via a cooling roller 50 for the exact temperature regulation of the film web 100. Subsequently the film web 100 reaches the first deflection roller 40, 40a which performs a deflection of the film web 100 in the direction of the first turning device 30, 30a. This in turn leads the film web 100 to a second deflection roller 40, 40b which in turn leads the film web 100 to a second turning device 30, 30b. Subsequently, the film web 100 is led to a third deflection roller 40, 40c from which the film web 100 leaves the reversing device 10.

Figure 5:
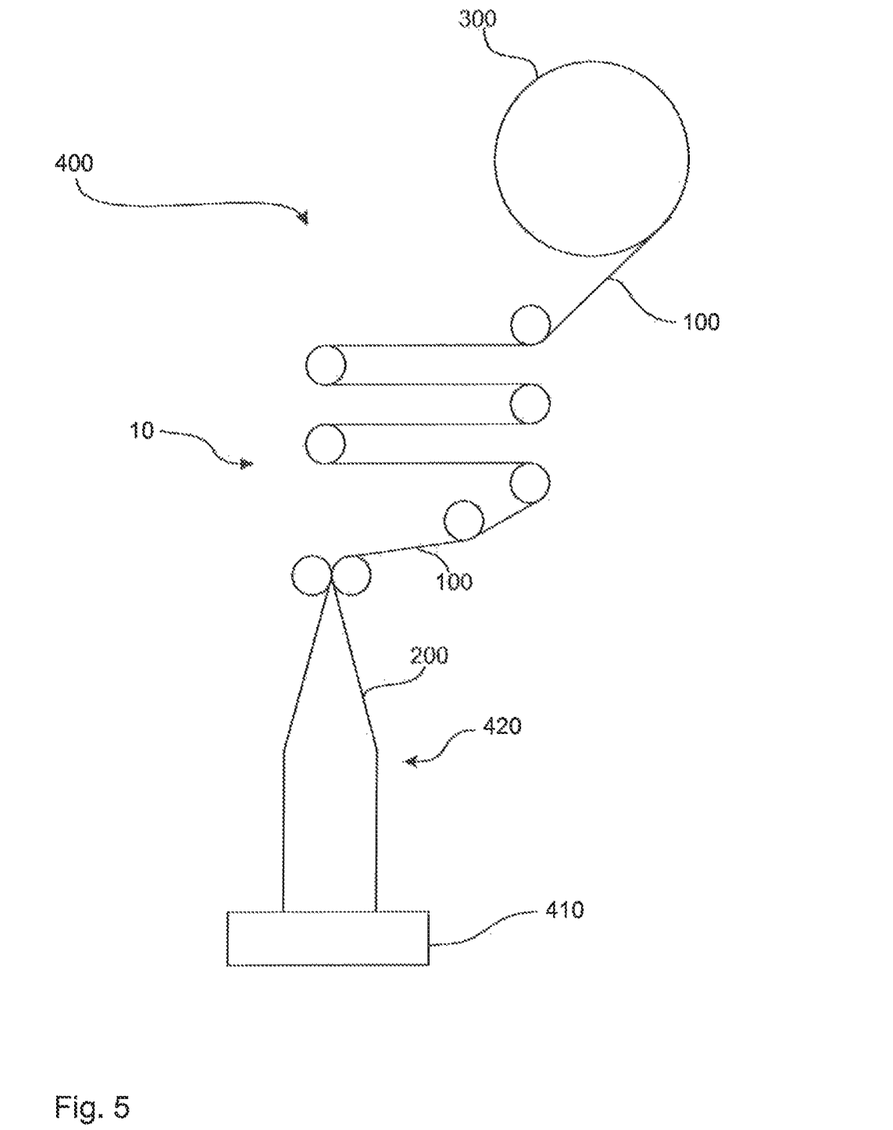

The embodiment like it is shown in FIG. 1 is particularly applied in a film blowing machine 400 like shown in FIG. 5. Subsequently the film web 100 is led to a winding device 300 which performs a winding of the film web 100. At the other entrance edge of the reversing device 10 a film extruder 410 is intended, which extrudingly produces the film bubble 200. The completed film bubble 200 is laid flat towards the film web 100 with the aid of a flat laying device 420.

In order to avoid corresponding defects with alternating thickness of the material of the film bubble concerning an addition on the winding film 300 during the production of the film bubble 200, a reversing device 10 is intended. After flat laying the film web 100 a reversing procedure occurs like subsequently schematically explained relating to FIG. 2a to 2c.

Figure 2A:
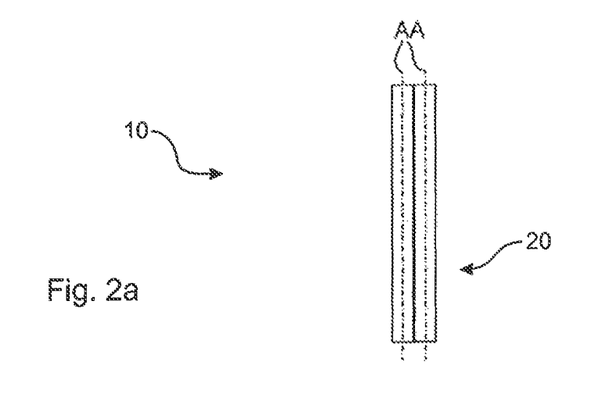
FIG. 2*a* an embodiment of a reversing device according to the invention in front view, FIG. 2b an embodiment of FIG. 2 with a take-off device reversed about 90° to the right, FIG. 2c an embodiment of FIG. 2a and FIG. 2b with a take-off device reversed about 90° to the left.
Figure 2B:
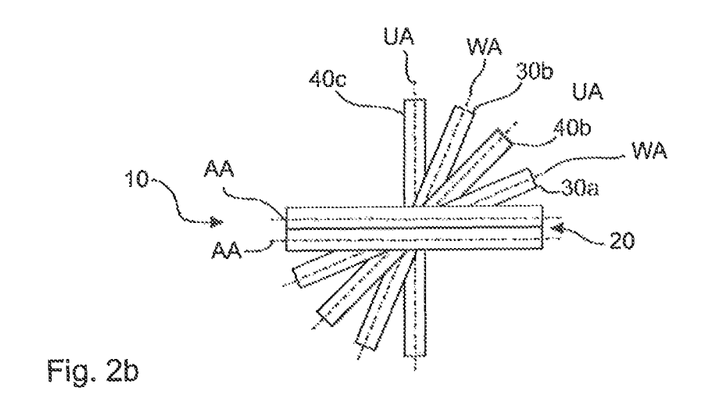

FIG. 2a shows a basic position of a take-off device 20, when the further deflection roller 40 and the turning devices 30 of the take-off device 20 are subordinate assembled. Correspondingly, these are not or hardly recognizable in the situation like it is shown in FIG. 2a. If now the start of the reversing procedure occurs a take-off device 20 rotates about its center. FIG. 2b shows the situation by which the take-off device 20 rotates about 90° to the right. Now the further deflection roller 40 and the turning devices 20 expand so that they are also recognizable in FIG. 2b. The single axes AA, VVA, UA are angularly assembled towards one another. The deflection roller 40 and the turning devices 30 lead the reversing film web 100, which is not shown in FIG. 2a to 2c due to reasons of clarity, back in a vertical position in which the film web lays parallel or mainly parallel towards the axis of rotation of the winding device 300. The angle difference between the single axes AA, VVA, UA is thereby mainly equal to one another in order to avoid unnecessary tensions in the film web 100.

Figure 2C:
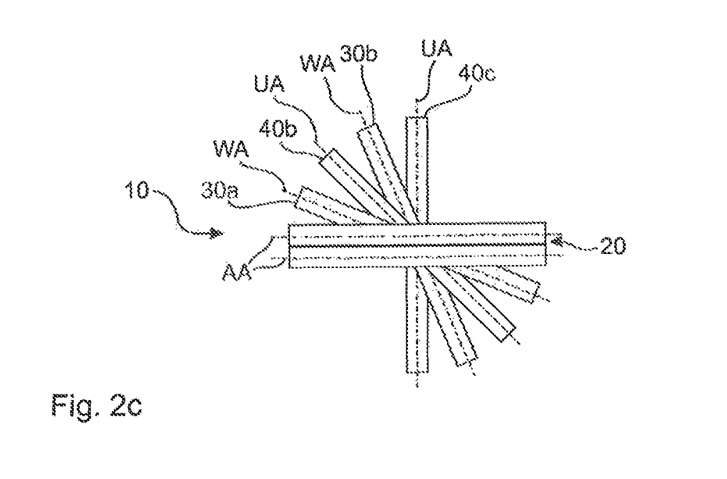

The last and third deflection roller 40c is already once again vertical. FIG. 2c shows a reversing situation with a take-off device 20 which is reversed about 90° to the left. This can already be end positions of the take-off device 20. Naturally it is also possible that the take-off device 20 comprises a bigger reversing angle. So for example reversing angles from up to ±180° or even more are possible within the scope of the present invention.

Figure 3:
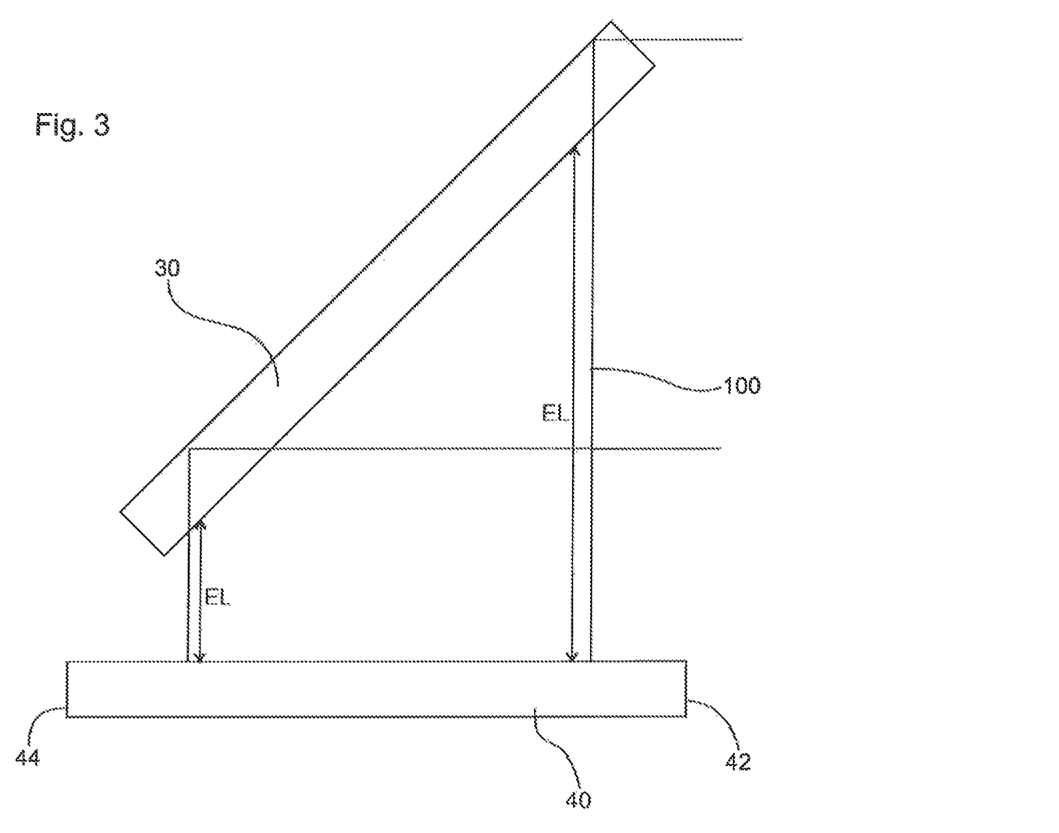
FIG. 3 a schematic description of the entrance length situation of a deflection roller, FIG. 4 a schematic representation of assembled expander elements, FIG. 5 a schematic representation of an embodiment of a film blowing machine according to the invention, FIG. 6 a schematic representation of the linear or mainly linear alteration of the transportability.
Figure 4:
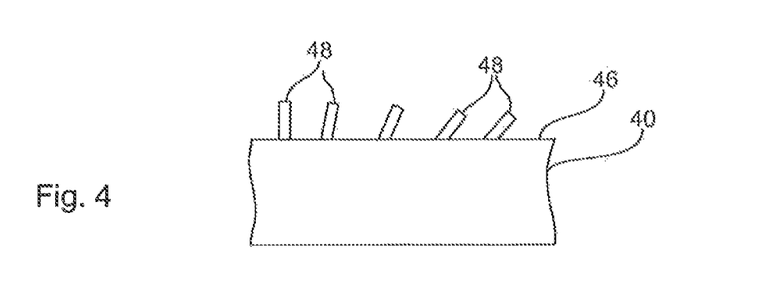

FIG. 3 shows that in the expander situation like it is exemplarily shown in FIGS. 2b and 2c different entrance lengths EL, for example to a deflection roller 40 from a turning device 30 dominate for the film web 100. The entrance length EL relates thereby to the loose distance in the transport direction between the deflection roller 40 and the turning device 30. As the expander ability of a deflection roller 40 shaped as an expander roller depends on the entrance length EL, in the present invention at least the second deflection roller 40b, particularly also further deflection rollers 40 are established with an increasing expander ability in the direction of the end faces 42 and 44. This increase of the expander ability can for example occur by an increase of the attack angles of the expander elements 48 like it is schematically shown in FIG. 4. These expander elements 48 can be lamella-like structures or for example bristles which are assembled at the peripheral surface 46 of the corresponding deflection roller 40. In this manner an increase of the expander force in the direction of the end faces 42 and 44 is achieved so that also in highly reversing orientation of the reversing device 10 a compensation of the highly differing entrance length EL occurs through the increased expander ability at the edge.

Figure 6:
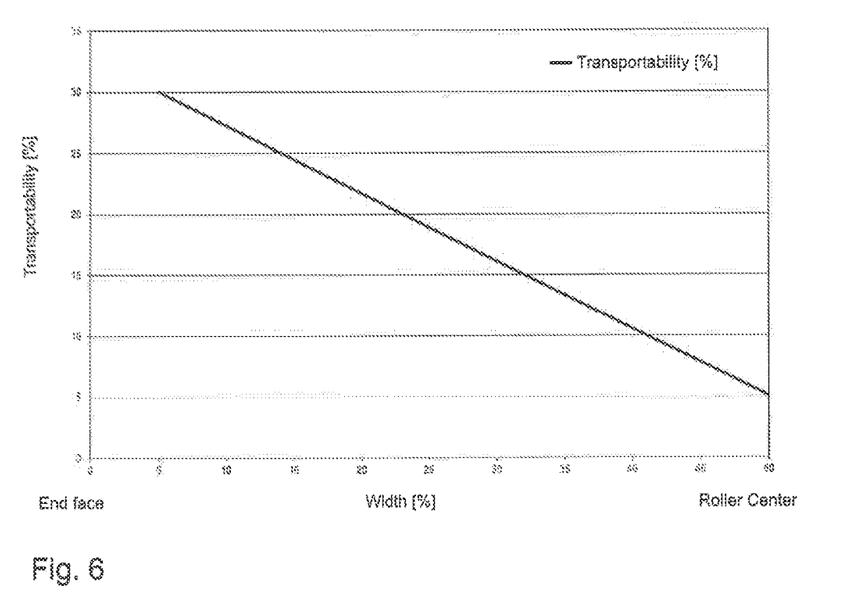

A linear, particularly mainly linear embodiment of the enhancement or increase of the expander ability or the transport ability in % is shown in the graphic of FIG. 6. There an increase of the expander ability/transport ability is recognized in axial direction, towards the end faces 42 and 44 of the deflection roller 40 for example by a corresponding alteration of the attack angles. Thereby also a stepwise, meaning levelwise increase of the expander ability/transport ability can be provided by the alteration of the angles of attack.

The previously described embodiments describe the present invention only in the scope of examples. So single features of the embodiments as they are technically meaningful can be freely combined with one another without leaving the scope of the present invention.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

REFERENCE SIGNS

10 Reversing device
20 Take-off device
20a Take-off roller

20b Take-off roller
30 Turning device
30a First turning device
30b Second turning device
40 Deflection roller
40a First deflection roller
40b Second deflection roller
40c Third deflection roller
42 End face of the deflection roller
44 End face of the deflection roller
48 Peripheral surface
48 Expander element
50 Cooling roller
100 Film web
200 Film bubble
300 Winding device
400 Film blowing machine
410 Film extruder
420 Flat laying device
AA Axis of the take-off device
WA Axis of the turning device
UA Axis of the deflection roller
EL Entering length

What is claimed is:

1. A reversing device for a film web, comprising:
take-off device, a turning device, and a deflection roller, the film web being guidable from the take-off device via the turning device and the deflection roller towards a winding device, and the axes (AA, WA, UA) of the take-off device, of the turning device, and the deflection roller being angularly modifiable towards one another, with a degree of expansion of the deflection roller depending upon a corresponding entrance length (EL) of the film web between the deflection roller and the turning device,
the deflection roller being an expansion stretch roller with increasing expansion stretch capability towards end faces thereof, in order to provide an efficient cuttling removal in a whole reverse angle area of the reversing device,
the deflection roller including at least sectionally expander elements on a peripheral surface thereof, the sectionally expander elements having an attack angle which increases in a direction of the end faces of the deflection roller, and including
starting from the take-off device alongside a distribution of the film web, a first deflection roller, a first turning device, a second deflection roller, a second turning device, and a third deflection roller,
the second deflection roller being the expansion stretch roller with the increasing expansion stretch ability towards the end faces thereof,
the first deflection roller and the take-off device having parallel to one another or substantially parallel to one another aligned axes (UA, AA),
the axis (UA) of the third deflection roller being parallel or substantially parallel to an axis of the winding device, and
the rotation of the first turning device correlating with ¾ of the rotation of the take-off device and/or the rotation of the second deflection roller correlating with ½ of the rotation of the take-off device and/or the rotation of the second turning device correlating with ¾ of the rotation of the take-off device.

2. The reversing device according to claim 1, wherein the attack angle increases starting from a center of the deflection roller towards the end faces thereof, from 0° to approximately 45°.

3. The reversing device according to claim 1, wherein the expander elements are at least partially configured as bristles.

4. The reversing device according to claim 1, wherein the expansion stretch ability of the deflection roller increases towards the end faces in a linear or substantially linear way.

5. The reversing device according to claim 1, wherein the expansion stretch ability of the deflection roller increases towards both end faces thereof in a symmetrical or substantially symmetrical way towards a center of the deflection roller.

6. The reversing device according to claim 1, wherein the turning device is cylindrically shaped.

7. The reversing device according to claim 1, further comprising a cooling roller positioned, with reference to the distribution of the film web, between the take-off device and the first deflection roller.

8. An apparatus comprising a flat laying device for laying flat of a film bubble to a film web, and
a reversing device for reversing the film web, including a take-off device, a turning device, and a deflection roller, the film web being guidable from the take-off device via the turning device and the deflection roller toward a winding device, and the axes (AA, WA, UA) of the take-off device, of the turning device, and the deflection roller being angularly modifiable toward one another, with a degree of expansion of the deflection roller depending upon a corresponding entrance length (EL) of the film web between the deflection roller and the turning device,
the deflection roller being an expansion stretch roller with increasing expansion stretch capability toward end faces thereof, in order, to provide an efficient cuttling removal in a whole reverse angle area of the reversing device,
the deflection roller including at least sectionally expander elements on a peripheral surface thereof, the sectionally expander elements having an attack angle which increases in a direction of the end faces of the deflection roller, and including
starting from the take-off device alongside a distribution of the film web, a first deflection roller, a first turning device, a second deflection roller, a second turning device, and a third deflection roller,
the second deflection roller being the expansion stretch roller with the increasing expansion stretch ability toward the end faces thereof,
the first deflection roller and the take-off device having parallel to one another or substantially parallel to one another aligned axes (UA, AA),
the axis (UA) of the third deflection roller being parallel or substantially parallel to an axis of the winding device, and
the rotation of the first turning device correlating with ¾ of the rotation of the take-off device and/or the rotation of the second deflection roller correlating with ½ of the rotation of the take-off device and/or the rotation of the second turning device correlating with ¾ of the rotation of the take-off device.

9. A film blowing machine comprising:
a film extruder for developing a film bubble;
a flat laying device for a laying flat of the film bubble to a film web;

a reversing device for a reversing of the film web; and a winding device for a wrapping of the film web, the reversing device including a take-off device, a turning device, and a deflection roller, the film web being guidable from the take-off device via the turning device and the deflection roller toward the winding device, and the axes (AA, WA, UA) of the take-off device, of the turning device, and the deflection roller being angularly modifiable toward one another, with a degree of expansion of the deflection roller depending upon a corresponding entrance length (EL) of the film web between the deflection roller and the turning device, the deflection roller being an expansion stretch roller with increasing expansion stretch capability toward end faces thereof, in order to provide an efficient cuttling removal in a whole reverse angle area of the reversing device, the deflection roller including at least sectionally expander elements on a peripheral surface thereof, the sectionally expander elements having an attack angle which increases in a direction of the end faces of the deflection roller, and including starting from the take-off device alongside a distribution of the film web, a first deflection roller, a first turning device, a second deflection roller, a second turning device, and a third deflection roller, the second deflection roller being the expansion stretch roller with the increasing expansion stretch ability toward the end faces thereof, the first deflection roller and the take-off device having parallel to one another or substantially parallel to one another aligned axes (UA, AA), the axis (UA) of the third deflection roller being parallel or substantially parallel to an axis of the winding device, and the rotation of the first turning device correlating with ¾ of the rotation of the take-off device and/or the rotation of the second deflection roller correlating with of the rotation of the take-off device and/or the rotation of the second turning device correlating with ¼ of the rotation of the take-off device.

10. The reversing device according to claim 6, wherein the turning device is an air turning rod.

* * * * *

UNITED STATES PATENT AND TRADEMARK OFFICE
CERTIFICATE OF CORRECTION

PATENT NO. : 10,011,451 B2
APPLICATION NO. : 14/413500
DATED : July 3, 2018
INVENTOR(S) : Markus Bussmann et al.

It is certified that error appears in the above-identified patent and that said Letters Patent is hereby corrected as shown below:

In the Claims

In Column 12, Line 16, change "of the second deflection roller correlating with of the" to --of the second deflection roller correlating with 1/2 of the--.

Signed and Sealed this
Sixth Day of November, 2018

Andrei Iancu
*Director of the United States Patent and Trademark Office*